(12) United States Patent
Harris, Jr. et al.

(10) Patent No.: US 9,429,025 B2
(45) Date of Patent: Aug. 30, 2016

(54) EROSION RESISTANT HELICOPTER BLADE

(75) Inventors: William C. Harris, Jr., Derby, CT (US); John P. Kopchik, Woodbridge, CT (US); Richard Ely, Derby, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 923 days.

(21) Appl. No.: 13/805,694

(22) PCT Filed: Apr. 21, 2011

(86) PCT No.: PCT/US2011/033384
§ 371 (c)(1),
(2), (4) Date: Dec. 20, 2012

(87) PCT Pub. No.: WO2012/009037
PCT Pub. Date: Jan. 19, 2012

(65) Prior Publication Data
US 2013/0101432 A1    Apr. 25, 2013

Related U.S. Application Data

(60) Provisional application No. 61/398,304, filed on Jun. 22, 2010.

(51) Int. Cl.
*F01D 5/14*    (2006.01)
*B64C 27/46*    (2006.01)
(Continued)

(52) U.S. Cl.
CPC ............. *F01D 5/147* (2013.01); *B64C 11/205* (2013.01); *B64C 27/463* (2013.01);
(Continued)

(58) Field of Classification Search
CPC . B64C 11/205; B64C 27/473; B64C 27/463;
B64C 2027/4733; B64C 2027/4736; F01D 5/147; F01D 5/28; F01D 5/286; F01D 5/288; F05D 2230/31–2230/314; F05D 2230/90; F05D 2300/611; Y10T 29/49337; Y10T 29/49332; F05B 2230/31–2230/314; F05B 2230/90; F05B 2280/6011
USPC ........ 416/224, 226, 229 R, 229 A, 230, 232, 416/233
See application file for complete search history.

(56) References Cited

U.S. PATENT DOCUMENTS 2,580,363 A * 12/1951 Schnitt .................. B64C 27/473
244/124
3,123,144 A * 3/1964 Stulen ................... B64C 27/473
416/226
(Continued)

OTHER PUBLICATIONS

European Search Report for application PCT/US2011033384, mailed Aug. 28, 2014, 6 pages.
(Continued)

*Primary Examiner* — Ninh H Nguyen
*Assistant Examiner* — Jesse Prager
(74) *Attorney, Agent, or Firm* — Cantor Colburn LLP

(57) ABSTRACT

A rotor blade including a main portion having a main portion leading edge shield; a main portion impact-resistant layer formed on a nose of the leading edge shield; a main portion erosion-resistant layer formed on a top and bottom of the main portion, rearward of the main portion impact-resistant layer; a main portion foil formed on the top and the bottom of the main portion rearward of the main portion erosion-resistant layer; a tip cap having a tip cap leading edge shield; a tip cap impact-resistant layer formed on a surface of the tip cap leading edge shield; and a tip cap foil formed on the top and the bottom of the tip cap rearward of the tip cap erosion-resistant layer.

16 Claims, 6 Drawing Sheets

(51) Int. Cl.
   *F01D 5/28*   (2006.01)
   *B64C 11/20*  (2006.01)
   *B64C 27/473* (2006.01)

(52) U.S. Cl.
   CPC ............ *B64C 27/473* (2013.01); *F01D 5/286* (2013.01); *F01D 5/288* (2013.01); *F05D 2230/311* (2013.01); *F05D 2230/90* (2013.01); *F05D 2300/611* (2013.01)

(56) References Cited

U.S. PATENT DOCUMENTS

| | | | |
|---|---|---|---|
| 3,967,996 A | | 7/1976 | Kamov et al. |
| 4,213,739 A | | 7/1980 | Euler et al. |
| 4,895,491 A | | 1/1990 | Cross et al. |
| 5,306,120 A | * | 4/1994 | Hammer ............... B64C 11/205 416/224 |
| 5,346,367 A | | 9/1994 | Doolin et al. |
| 5,542,820 A | | 8/1996 | Eaton et al. |
| 5,782,607 A | | 7/1998 | Smith et al. |
| 6,341,747 B1 | | 1/2002 | Schmidt et al. |
| 6,497,968 B2 | * | 12/2002 | Zhao ..................... C04B 41/009 106/286.4 |
| 7,547,193 B2 | | 6/2009 | Moffitt et al. |
| 7,581,933 B2 | | 9/2009 | Bruce et al. |
| 7,771,173 B2 | | 8/2010 | Leahy et al. |
| 7,854,593 B2 | | 12/2010 | Owen |
| 2009/0011195 A1 | | 1/2009 | Bruce et al. |
| 2009/0148303 A1 | * | 6/2009 | Leahy ................... B64C 27/463 416/226 |
| 2009/0269205 A1 | * | 10/2009 | Leahy ................... B64C 27/463 416/226 |
| 2010/0008788 A1 | | 1/2010 | Barbee et al. |

OTHER PUBLICATIONS

PCT Preliminary Report on Patentability and Written Opinin of the International Searching Authority for International Application No. PCT/US2011/033384, Jan. 10, 2013, 6 pgs.

PCT International Search Report and Written Opinion of the International Searching Authority for International Application No. PCT/US2011/033384, Jan. 17, 2012, 4 pages.

* cited by examiner

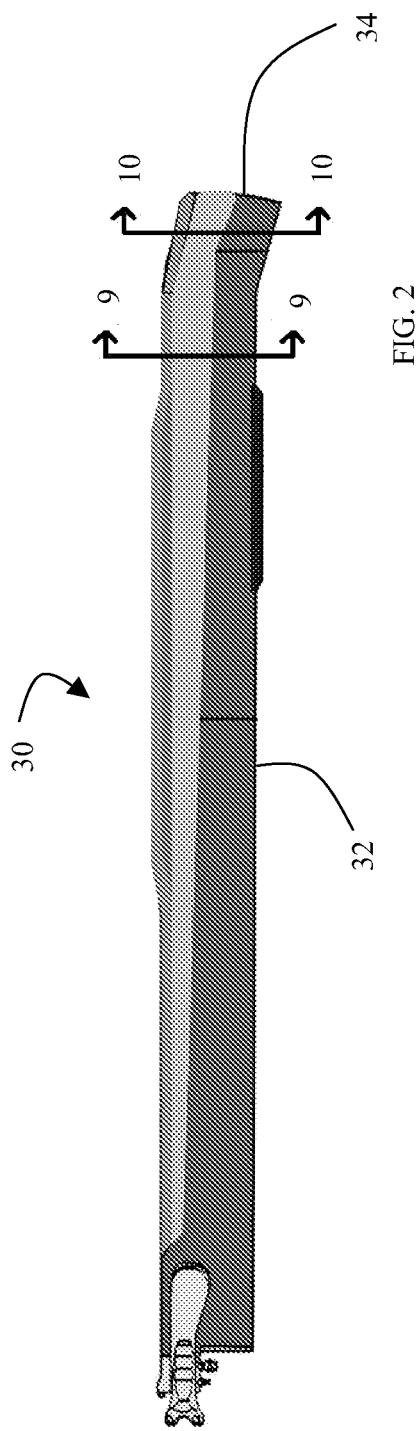
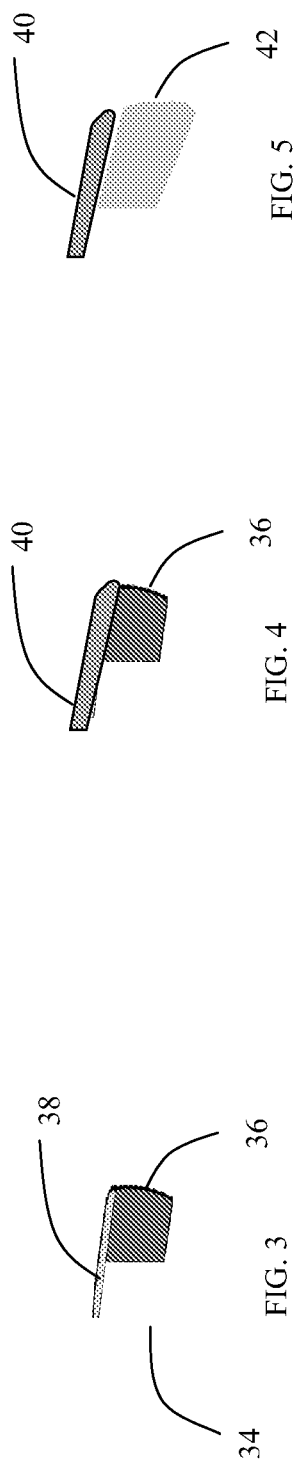

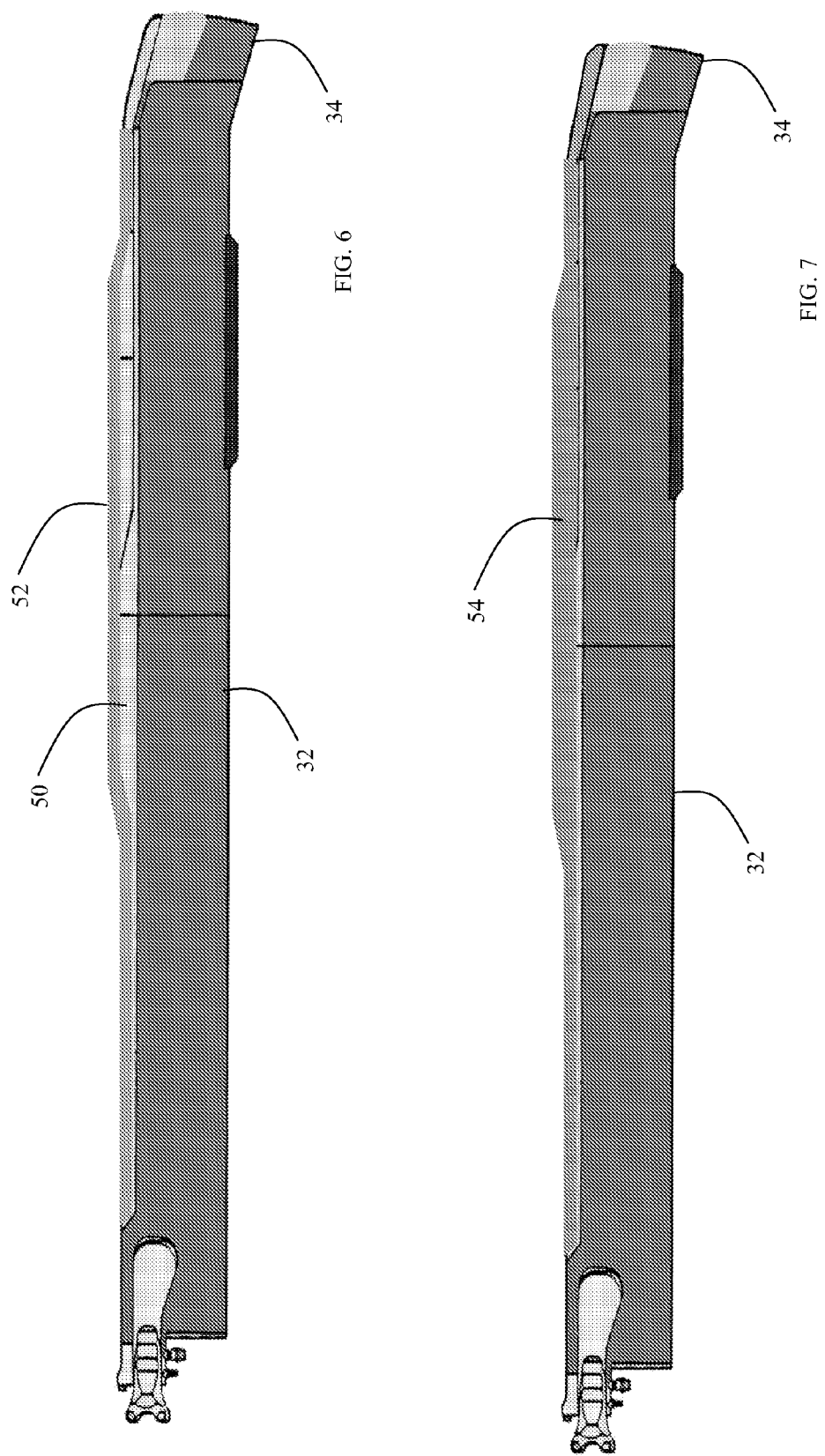

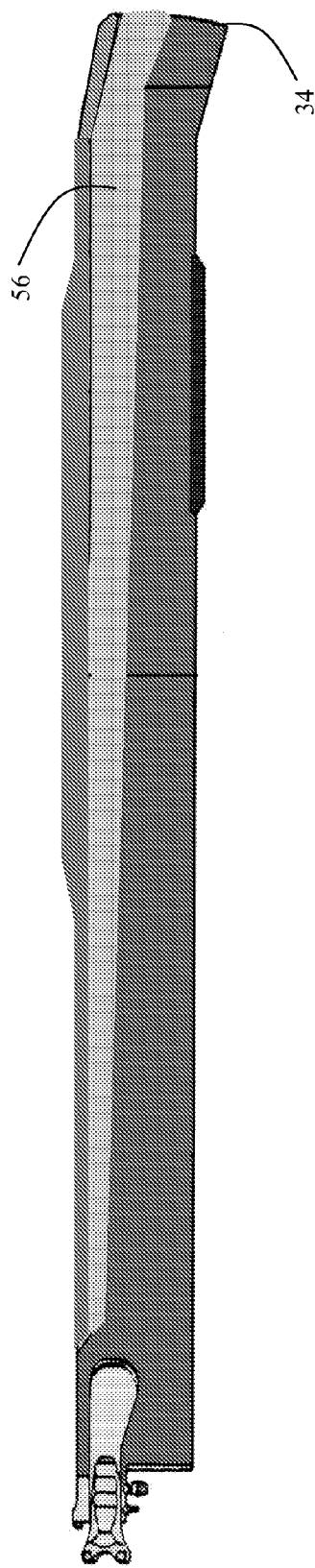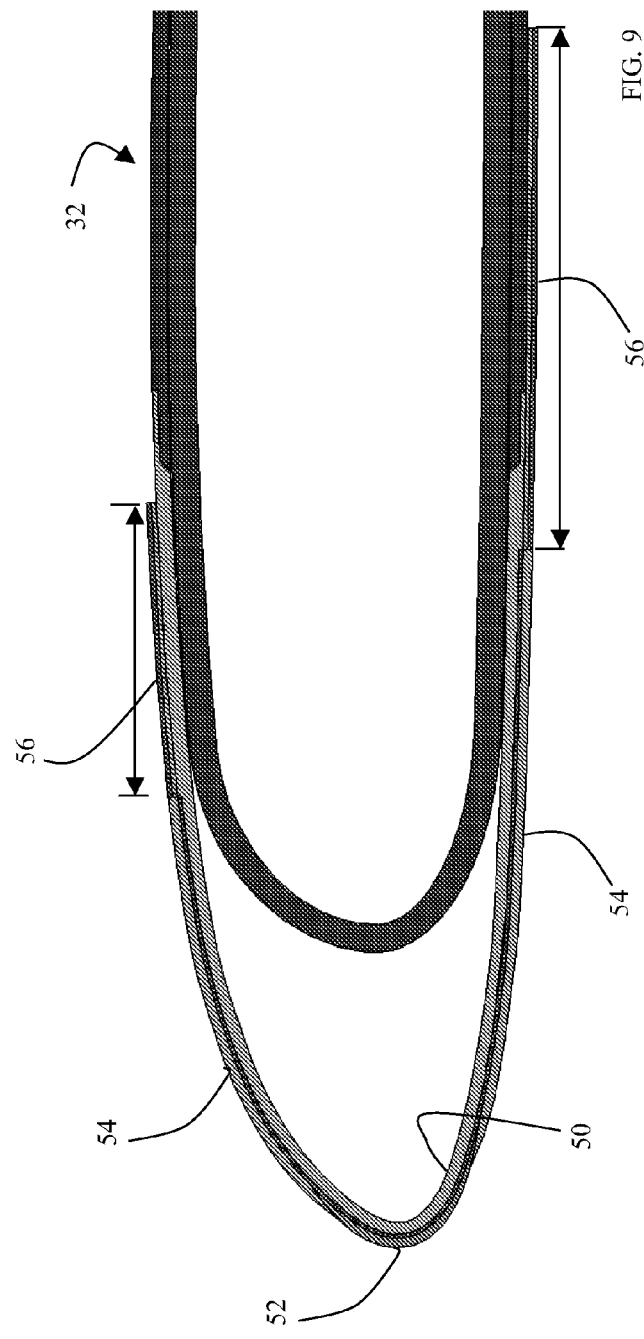

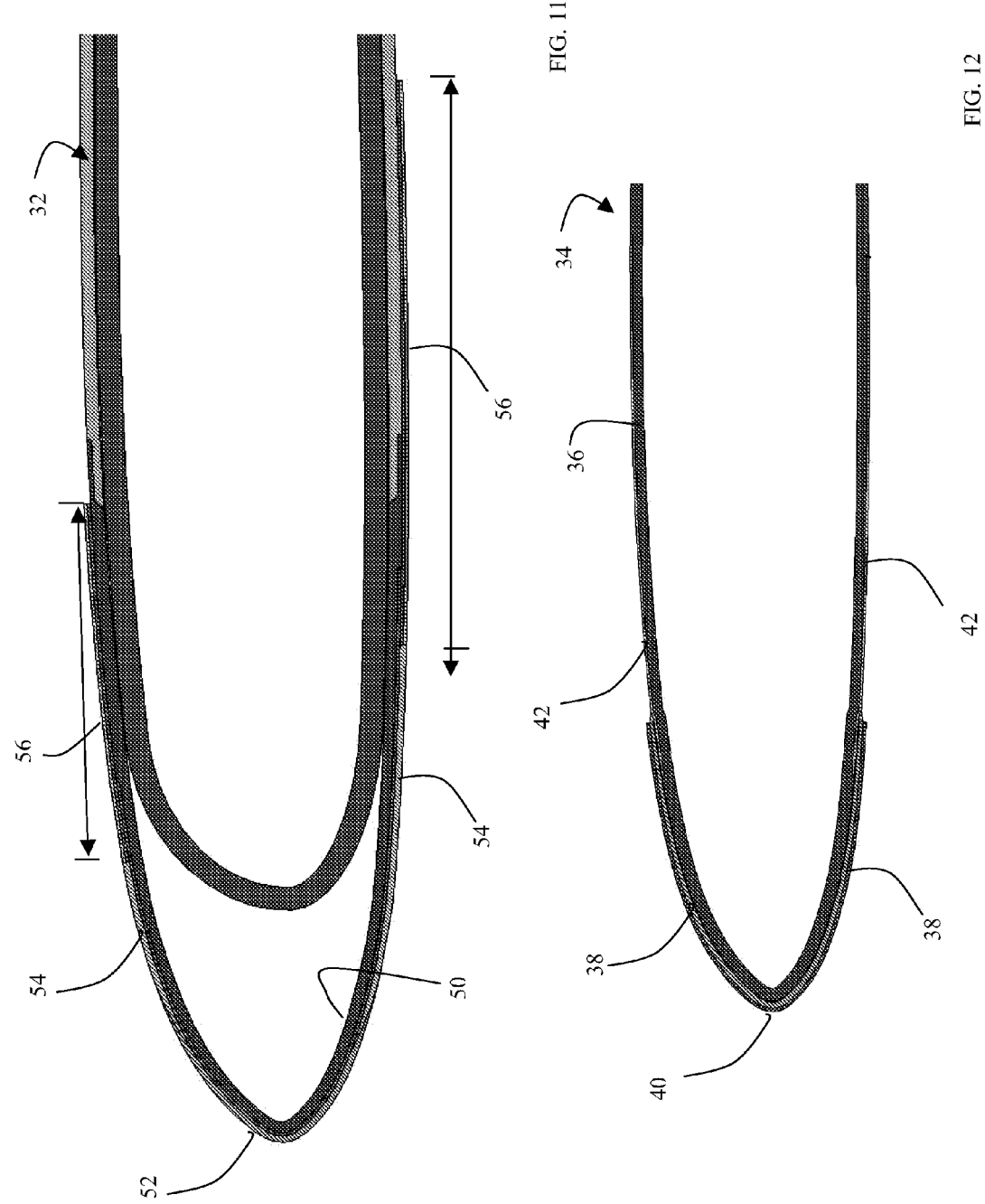

EROSION RESISTANT HELICOPTER BLADE

CROSS REFERENCE TO RELATED APPLICATIONS

This application claims the benefit of U.S. provisional patent application Ser. No. 61/398,304, filed Jun. 22, 2010, the entire contents of which are incorporated herein by reference.

STATEMENT REGARDING FEDERALLY SPONSORED RESEARCH OR DEVELOPMENT

This invention was made with Government support under Agreement No. W911W6-08-2-0006 for Rotor Durability Army Technology Objective (ATO). The Government has certain rights in the invention.

BACKGROUND

Existing rotor blades for helicopters include fiberglass and carbon fiber composite skins and titanium and nickel leading edge shields. The titanium and nickel leading edge shields are designed to combat erosion. The titanium shield oxidizes as it is impacted by sand and rocks, and causes a halo around the rotor path, which is highly visible at nighttime. This is detrimental because the aircraft is highly visible and the halo can be a distraction to pilots trying to land an aircraft under the assistance of night vision equipment. There is a need in the art to provide erosion protection to rotor blades to improve the life of the blades and to eliminate effects of shield oxidation.

SUMMARY

An exemplary embodiment is a rotor blade including a main portion having a main portion leading edge shield; a main portion impact-resistant layer formed on a nose of the leading edge shield; a main portion erosion-resistant layer formed on a top and bottom of the main portion, rearward of the main portion impact-resistant layer; a main portion foil formed on the top and the bottom of the main portion rearward of the main portion erosion-resistant layer; a tip cap having a tip cap leading edge shield; a tip cap impact-resistant layer formed on a surface of the tip cap leading edge shield; and a tip cap foil formed on the top and the bottom of the tip cap rearward of the tip cap erosion-resistant layer.

Another exemplary embodiment is a method of manufacturing a rotor blade including obtaining a main portion having a main portion leading edge shield; applying a main portion erosion-resistant layer on a top and bottom of the leading edge shield; applying a main portion impact-resistant layer on a nose of the leading edge shield, forward of the main portion erosion resistant layer; applying a main portion foil on the top and the bottom of the main portion rearward of the main portion erosion-resistant layer; obtaining a tip cap having a tip cap leading edge shield; applying a tip cap impact-resistant layer on a surface of the tip cap leading edge shield; and applying a tip cap foil on the top and the bottom of the tip cap rearward of the tip cap erosion-resistant layer.

BRIEF DESCRIPTION OF THE DRAWINGS

The above described and other features, aspects, and advantages of the present invention are better understood when the following detailed description of the invention is read with reference to the accompanying drawings, wherein:

FIG. 2 is a top view of a main rotor blade in exemplary embodiments;

FIGS. 3-5 depict formation of a tip cap;

FIGS. 6-8 depict formation of a main rotor blade;

FIG. 9 is a cross-sectional view taken along line 9-9 of FIG. 2;

FIG. 11 is a cross-sectional view taken along line 9-9 of FIG. 2 in an alternate embodiment; and FIG. 12 is a cross-sectional view taken along line 10-10 of FIG. 2 in an alternate embodiment.

DETAILED DESCRIPTION

Figure 1:
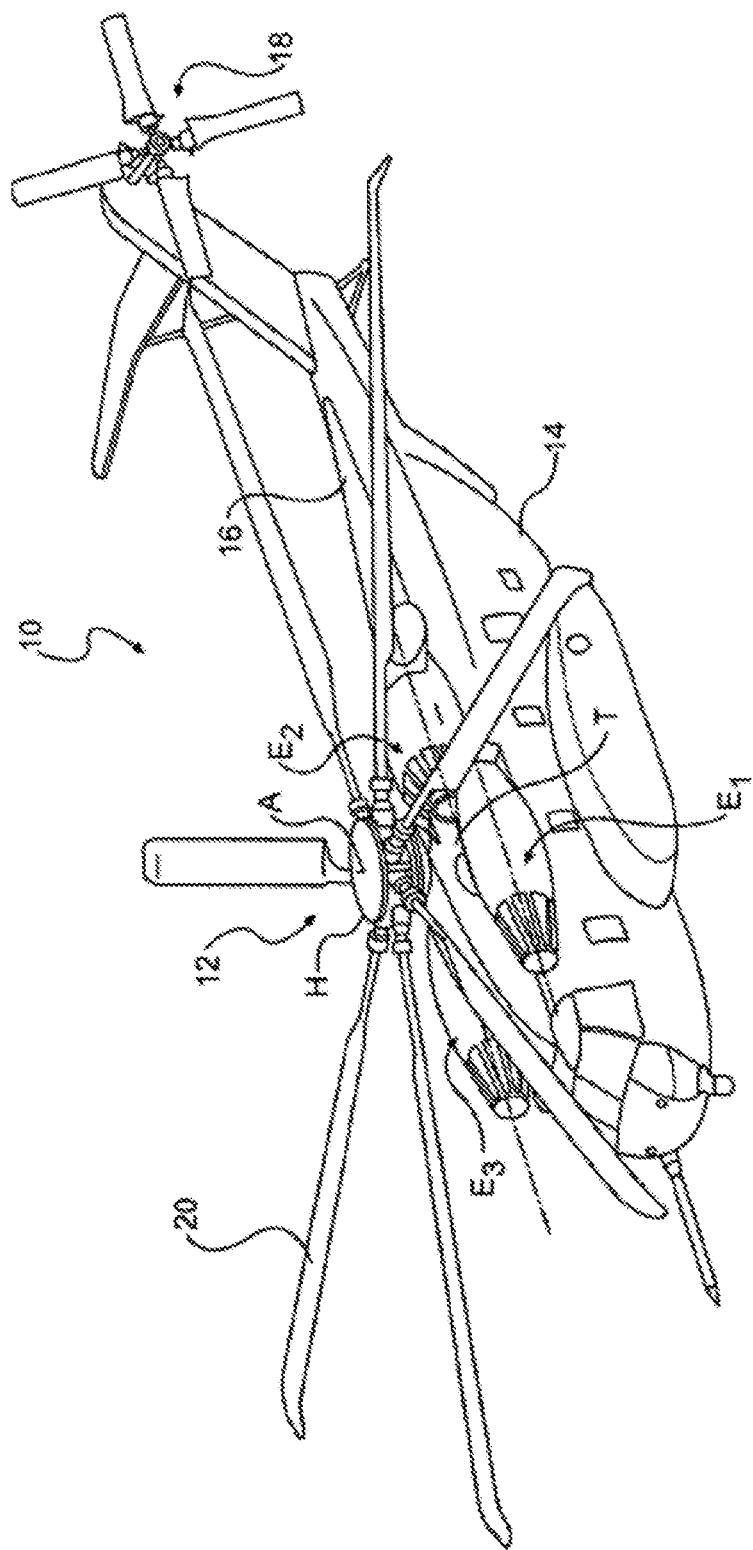
FIG. 1 is a perspective view of a rotary wing aircraft for use with the present invention.

FIG. 1 schematically illustrates a rotary-wing aircraft 10 having a main rotor system 12. The aircraft 10 includes an airframe 14 having an extending tail 16, which mounts a tail rotor system 18, such as an anti-torque system. The main rotor assembly 12 is driven about an axis of rotation A through a main gearbox (illustrated schematically at T) by one or more engines $E_1$-$E_3$. The main rotor system 12 includes a multiple of rotor blade assemblies 20 mounted to a rotor hub H. Although a particular helicopter configuration is illustrated and described in the disclosed non-limiting embodiment, other configurations and/or machines, such as high speed compound rotary wing aircraft with supplemental translational thrust systems, dual contra-rotating, coaxial rotor system aircraft, turbo-props, tilt-rotors and tilt-wing aircraft, will also benefit from the present invention.

FIG. 2 is a top view of a main rotor blade 30 in exemplary embodiments. The rotor blade 30 includes a main portion 32 and a tip cap 34. As embodiments relate to modifications to the leading edge and upper and lower surfaces of the main portion 32 and tip cap 34, description of the entire structure of the rotor blade 30 is not provided herein. FIG. 3 is a top view of the tip cap 34 prior to applying erosion resistant materials. Tip cap 34 includes a tip cap body 36 formed from, for example, a composite material as is known in the art, and a tip cap leading edge shield 38 formed from a nickel material as is known in the art. Tip cap leading edge shield 38 extends rearward from the nose of the tip cap body 36 to serve as a tip cap erosion-resistant layer that provides protection high-velocity impacts at the tip cap leading edge.

FIG. 4 illustrates application of an impact-resistant layer 40 to the nose of the tip cap leading edge shield 38. In exemplary embodiments, the tip cap impact-resistant layer 40 is an HVOF high-velocity sprayed, tungsten carbide coating. Impact-resistant layer 40 provides protection against high angle, high velocity impacts to the leading edge of the tip cap 34.

FIG. 5 illustrates application of tip cap metal foils 42 to the tip cap body 36, rearward of the nickel strip 38. In exemplary embodiments, the metal foils 42 are stainless steel foils bonded to the composite tip cap body 36. The metal foils 42 are applied to the upper and lower composite skins on the tip cap body 36 to provide protection from lower angle, glancing impacts.

FIG. 6 illustrates the tip cap 34 secured to the main portion 32 of main rotor 30. FIG. 6 also depicts application of a main portion impact-resistant layer 52. Impact-resistant layer 52 is applied to the nose of an existing metal (e.g. titanium) leading edge shield 50 of the main portion 32 of rotor blade 30. In exemplary embodiments, the main portion impact-resistant layer 52 is an HVOF high-velocity sprayed, tungsten carbide coating. Impact resistant layer 52 provides protection against high angle impacts to leading edge shield 50 of the main portion 32.

FIG. 7 illustrates application of a main portion erosion-resistant layer 54 to the top and bottom of leading edge shield 50 of the main portion 32 of main rotor 30. The erosion-resistant layer 54 overlaps an edge of impact-resistant coating 52, but does not encompass the entire impact-resistant layer 52. In exemplary embodiments, the main portion erosion-resistant layer 54 is a cold-spray niobium metal. Erosion-resistant layer 54 provides protection from the lower angle impacts. Both impact-resistant layer 52 and erosion-resistant layer 54 are applied minimally, to minimize weight. Impact-resistant layer 52 and erosion-resistant layer 54 are only applied onto the leading edge titanium shield 50 for two reasons. First, the severity of the application processes facilitates applying the coatings to a metal substrate. Second, covering the leading edge titanium shield 50 eliminates the sparking halo effect.

FIG. 8 illustrates application of main portion metal foils 56 to the main portion 32, rearward of the erosion-resistant layer 54. In exemplary embodiments, the metal foils 56 are stainless steel foils bonded to the composite main portion 32. The metal foils 56 are applied to the upper and lower composite skins on the main portion 32 to provide protection from lower angle, glancing impacts.

A tail rotor blade (not shown), may be formed in the same manner as the main portion 32 of rotor blade 30. As noted above, this entails an impact-resistant layer on the nose of the leading edge, an erosion-resistant layer on the top and bottom, rearward of the impact-resistant coating and metal foils on the upper and lower composite skins.

FIG. 9 is a cross-sectional view taken along line 9-9 of FIG. 2. FIG. 9 shows the main portion 32 of main rotor blade 30. Evident in FIG. 9 is the impact-resistant layer 52 formed on the nose of metal leading edge shield 50, top and bottom erosion-resistant layers 54 formed rearward to the impact-resistant layer 52, and top and bottom metal foils 56 formed rearward of the erosion-resistant layer 54. Bottom metal foil 56 extends further back from the leading edge than the top metal foil 56.

Figure 10:
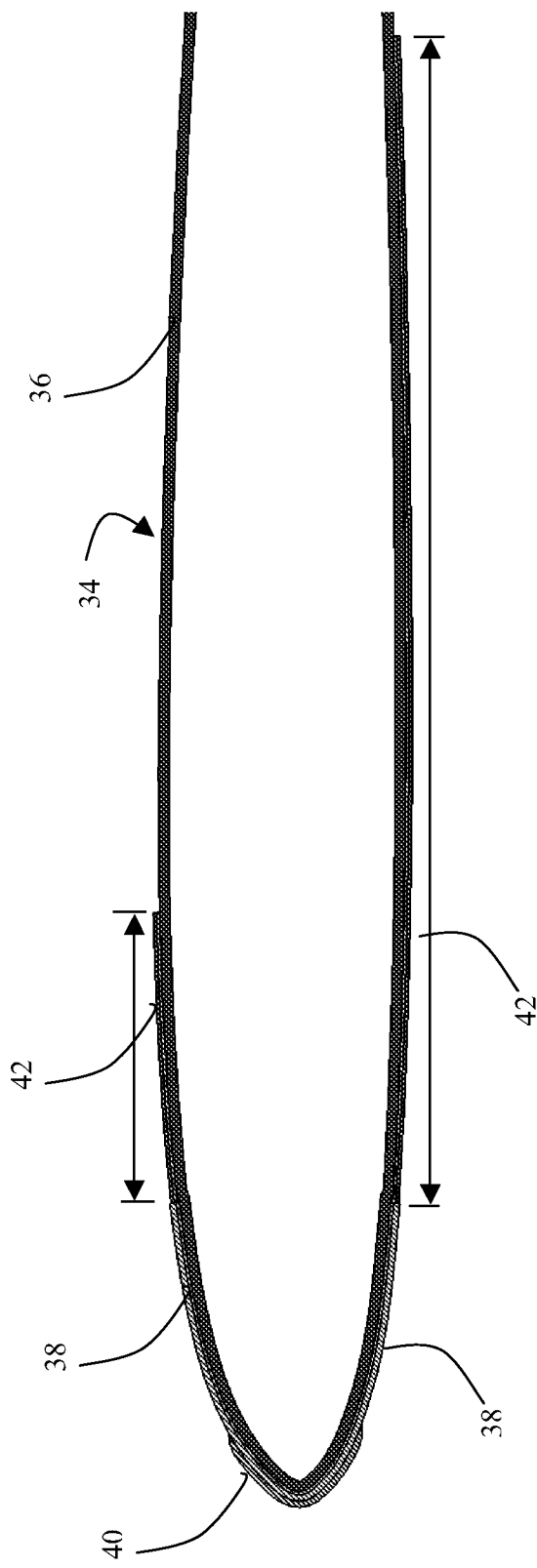
FIG. 10 is a cross-sectional view taken along line 10-10 of FIG. 2.

FIG. 10 is a cross-sectional view taken along line 10-10 of FIG. 2. FIG. 10 shows the tip cap 34. Evident in FIG. 10 are the impact-resistant layer 40 formed on the nose of tip cap leading edge shield 38 and top and bottom metal foils 42 formed rearward of the tip cap leading edge shield 38. Bottom metal foil 42 extends further back from the leading edge than the top metal foil 42.

FIG. 11 is a cross-sectional view taken along line 9-9 of FIG. 2 in an alternate embodiment. This embodiment is similar to that in FIG. 9, except that top and bottom erosion-resistant layers 54 are formed prior to formation of the impact-resistant layer 52. As such, the erosion-resistant layers 54 underlap the impact-resistant layer 52. As discussed above, top and bottom metal foils 56 are formed rearward of the erosion-resistant layer 54. Bottom metal foil 56 extends further back from the leading edge than the top metal foil 56.

FIG. 12 is a cross-sectional view taken along line 10-10 of FIG. 2 in an alternate embodiment. This embodiment is similar to that in FIG. 10, except that the impact resistant layer 40 covers entire leading edge strip 38, rather than just the nose. Further, tip cap metal foils 42 extend same length on upper and lower side of the tip cap body 36.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A rotor blade comprising:
   a main portion having a main portion leading edge shield;
   a main portion impact-resistant layer formed on a nose of the leading edge shield;
   a main portion erosion-resistant layer formed on a top and bottom of the main portion with forward-most edges terminating rearward of a forward section of the main portion impact-resistant layer;
   a main portion foil formed on the top and the bottom of the main portion with forward-most edges terminating rearward of a forward section of the main portion erosion-resistant layer;
   a tip cap having a tip cap leading edge shield acting as a tip cap erosion-resistant layer;
   a tip cap impact-resistant layer formed on a surface of the tip cap leading edge shield; and
   a tip cap foil formed on the top and the bottom of the tip cap with forward-most edges terminating rearward of a forward section of the tip cap erosion-resistant layer.

2. The rotor blade of claim 1 wherein:
   the main portion impact-resistant layer is a tungsten carbide layer.

3. The rotor blade of claim 1 wherein:
   the main portion erosion-resistant layer is a niobium layer.

4. The rotor blade of claim 3 wherein:
   the main portion erosion-resistant layer overlaps the main portion impact-resistant layer.

5. The rotor blade of claim 3 wherein:
   the main portion erosion-resistant layer underlaps the main portion impact-resistant layer.

6. The rotor blade of claim 1 wherein:
   the main portion foil is a steel foil.

7. The rotor blade of claim 1 wherein:
   the tip cap impact-resistant layer is a tungsten carbide layer.

8. The rotor blade of claim 1 wherein:
   the tip cap foil is a steel foil.

9. A method of manufacturing a rotor blade comprising:
   obtaining a main portion having a main portion leading edge shield;
   applying a main portion erosion-resistant layer on a top and bottom of the leading edge shield;
   applying a main portion impact-resistant layer on a nose of the leading edge shield with forward-most edges of the main portion erosion resistant layer terminating rearward of a forward section of the main portion impact-resistant layer;
   applying a main portion foil on the top and the bottom of the main portion with forward-most edges terminating rearward of a forward section of the main portion erosion-resistant layer;
   obtaining a tip cap having a tip cap leading edge shield acting as a tip cap erosion-resistant layer;

applying a tip cap impact-resistant layer on a surface of the tip cap leading edge shield; and applying a tip cap foil on the top and the bottom of the tip cap with forward-most edges terminating rearward of a forward section of the tip cap erosion-resistant layer.

10. The method of claim 9 wherein:

the main portion impact-resistant layer is a tungsten carbide layer.

11. The method of claim 9 wherein:

the main portion erosion-resistant layer is a niobium layer.

12. The method of claim 11 wherein:

the main portion erosion-resistant layer overlaps the main portion impact-resistant layer.

13. The method of claim 11 wherein:

the main portion erosion-resistant layer underlaps the main portion impact-resistant layer.

14. The method of claim 9 wherein:

the main portion foil is a steel foil.

15. The method of claim 9 wherein:

the tip cap impact-resistant layer is a tungsten carbide layer.

16. The method of claim 9 wherein:

the tip cap foil is a steel foil.

* * * * *